United States Patent
Hoffman et al.

(10) Patent No.: US 9,648,023 B2
(45) Date of Patent: May 9, 2017

(54) VEHICLE MODULE UPDATE, PROTECTION AND DIAGNOSTICS

(71) Applicant: Movimento Group, Plymouth, MI (US)

(72) Inventors: Benjamin J. Hoffman, Dexter, MI (US); Dan Umbach, Brighton, MI (US)

(73) Assignee: Movimento Group, Plymouth, MI (US)

( * ) Notice: Subject to any disclaimer, the term of this patent is extended or adjusted under 35 U.S.C. 154(b) by 26 days.

(21) Appl. No.: 14/589,729

(22) Filed: Jan. 5, 2015

(65) Prior Publication Data
US 2016/0197932 A1    Jul. 7, 2016

(51) Int. Cl.
*H04L 29/06* (2006.01)
*H04L 29/08* (2006.01)
*G06F 9/445* (2006.01)

(52) U.S. Cl.
CPC .............. *H04L 63/102* (2013.01); *G06F 8/65* (2013.01); *H04L 67/12* (2013.01); *H04L 67/34* (2013.01)

(58) Field of Classification Search
CPC ....... H04L 63/102; H04L 63/08; H04L 63/10; H04W 12/06; H04W 12/08
See application file for complete search history.

(56) References Cited

U.S. PATENT DOCUMENTS

| | | | | |
|---|---|---|---|---|
| 2008/0005733 A1* | 1/2008 | Ramachandran | ......... | G06F 8/65 7/168 |
| 2008/0244757 A1* | 10/2008 | Nakagaki | ................ | B60R 25/00 726/28 |
| 2012/0110296 A1* | 5/2012 | Harata | .................... | G06F 12/06 711/203 |
| 2015/0121071 A1* | 4/2015 | Schwarz | ................. | H04L 63/12 713/168 |
| 2015/0191135 A1* | 7/2015 | Ben Noon | ............ | B60R 16/023 726/22 |
| 2015/0191136 A1* | 7/2015 | Ben Noon | ............ | B60R 16/023 726/23 |
| 2015/0358329 A1* | 12/2015 | Noda | ....................... | G06F 21/57 726/4 |
| 2016/0013934 A1* | 1/2016 | Smereka | ............... | G06F 21/572 713/171 |

* cited by examiner

*Primary Examiner* — Yonas Bayou
(74) *Attorney, Agent, or Firm* — Great Lakes Intellectual Property, PLLC.

(57) ABSTRACT

Updating, protecting, diagnosing and/or otherwise managing a server, module or other analogous device(s) included on a vehicle for the purposes of facilitating a vehicle related operation is contemplated. A local controller physical connected or otherwise associated with to the vehicle may be employed to implement the contemplated processes, optionally at the direction of a remote controller or other master controller having capabilities sufficient to provide corresponding instructions thereto.

24 Claims, 3 Drawing Sheets

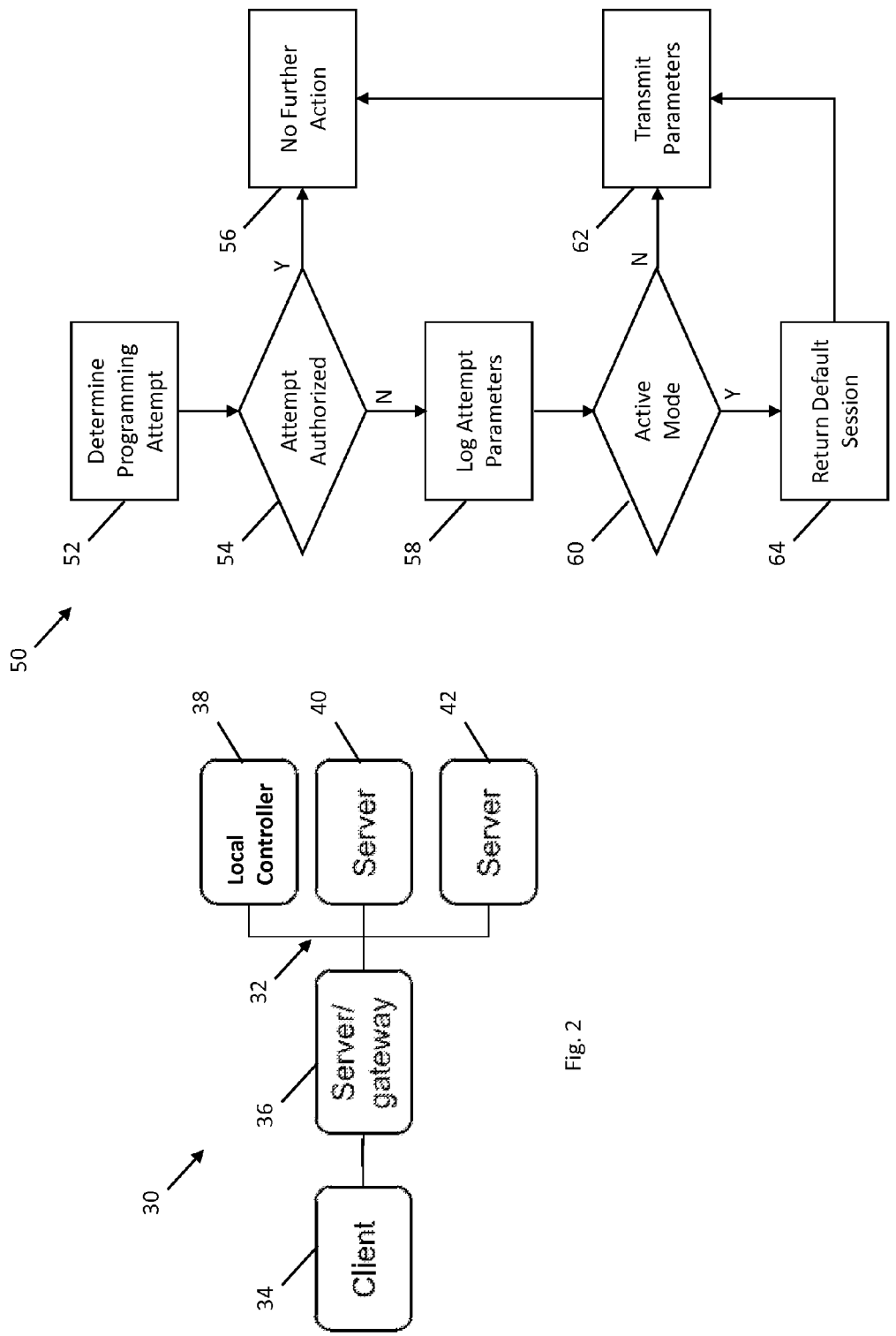

VEHICLE MODULE UPDATE, PROTECTION AND DIAGNOSTICS

TECHNICAL FIELD

The present invention relates to updating, protecting and diagnosing servers, modules, devices, software applications or other logically executing constructs included on a vehicle, such as but not necessarily limited to thwarting unauthorized clients from replacing and/or updating files included within a memory of a server connected to a vehicle based controller area network (CAN) with a new file or new computer-readable instructions, code, data or other information sufficient to facilitate updating operations associated therewith.

BACKGROUND

International Standard (ISO) 14229-1, first edition 2006 Dec. 1, corrected version 2007 Apr. 15, entitled Road vehicles—Unified diagnostic services (UDS)—Part 1: Specification and requirements, the disclosure of which is incorporated by reference in its entirety herein, specifies data link independent requirements of diagnostic services that allow a diagnostic tester (client) to control diagnostic functions in an on-vehicle Electronic Control Unit (server), such as but not necessarily limited to a heads-up display (HUD), a power control module (PCM), an electronic fuel injection, automatic gear box, anti-lock braking system or other module connected on a serial data link embedded in a road vehicle. International Standard (ISO) 15765-3, first edition 2004 Oct. 15, entitled Road vehicles—Diagnostics on Controller Area Networks (CAN)—Part 3: Implementation of unified diagnostic services (UDS on CAN), the disclosure of which is hereby incorporated by reference in its entirety herein, has been established in order to enable the implementation of unified diagnostic services, as specified in ISO 14229-1, on controller area networks (UDS on CAN).

One of the diagnostic services associated with the aforementioned standards relates to a DiagnosticSessionControl service having a programmingSession subfunction for enabling operations to support memory programming of a server. The programmingSession subfunction can be engaged with a client to facilitate replacing and/or updating files or other memory constructs of the server, such as to facilitate changing parameters of an HUD, varying engine timing or other parameters associated with an engine control module (ECM) and to perform virtually any type of operational alteration to the various modules and systems operating within a road vehicle. The updating of such servers, particularly by unauthorized individuals or non-original equipment manufacturers (OEMs), can have problematic effects on the corresponding servers, e.g., changing timing parameters of the ECM may cause the engine to perform inadequately. One non-limiting aspect of the present invention contemplates preventing and/or ameliorating the effects associated with the unauthorized use of the programmingSession or other similar processes compliant with other standards and protocols having capabilities sufficient to facilitate updating servers included on a road vehicle or other vehicle/device.

BRIEF DESCRIPTION OF THE DRAWINGS

FIG. 2 illustrates a schematic of vehicle architecture in accordance with one non-limiting aspect of the present invention.

FIG. 3 illustrates a flowchart of a method for thwarting unauthorized updates in accordance with the present invention.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
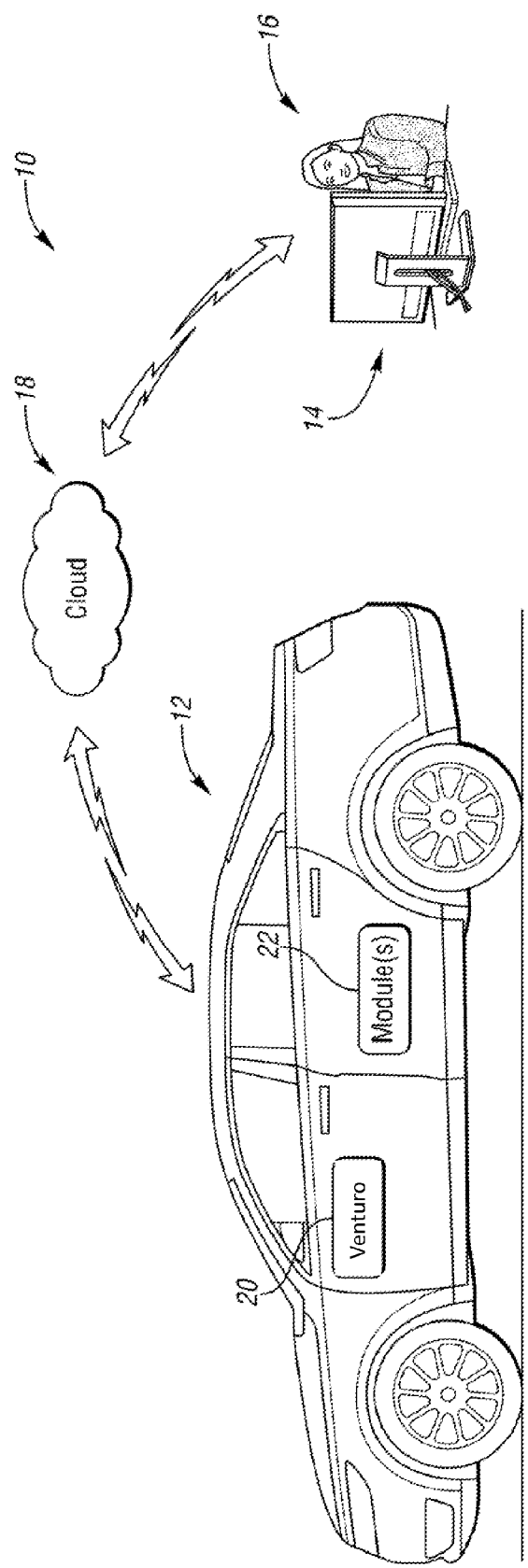
FIG. 1 illustrates a system in accordance with one non-limiting aspect of the present invention.

FIG. 1 illustrates a system 10 in accordance with one non-limiting aspect of the present invention. The system 10 is shown for exemplary non-limiting purposes with respect to facilitate updating, protecting, diagnosing and/or otherwise managing through over the air (OTA) communications a vehicle 12 using one or more files provided from a remote controller 14. A manager or other individual 16 associated with the remote controller 14 may input the files needed for the remote controller 14, which may communicate an appropriate one or more of files to the vehicle 12 by way of a network, cloud or other communication medium 18. Once delivered to the vehicle 12, a local controller 20, which may be referred to as vPuma™ or Venturo™ device, may be configured to process the files in a manner sufficient to facilitate updating, protecting, diagnosing and/or otherwise managing one or more modules 22 included within the vehicle 12, which in terms of the above-identified ISO specifications are hereinafter periodically referred to as servers. In this manner, the present invention facilitates the contemplated control of the vehicle servers 22 without requiring the vehicle owner to take the vehicle 12 to dealership or to possess any specialized expertise, at least with respect to performing software updates or otherwise having capabilities generally associated with a mechanic or other individual licensed to repair vehicles.

The present invention is predominately described with respect to facilitating updates for automobiles for exemplary non-limiting purposes as the present invention fully contemplates its use and application in facilitating similar processes for other types of vehicles, including but not necessary limited to vessels, airplanes, trains, trucks, etc., and/or non-vehicles, including but not necessary limited to industrial control systems, white goods and medical devices. The present invention is also described with respect to facilitating an updating mode where the remote and local controllers 14, 20 cooperate to facilitate replacing, modifying, re-flashing, re-configuring, re-calibrating or otherwise manipulating computer-readable instructions, software, code or other logically executing or logically controllable features of the module 22 according to the files or other data provided from the remote controller 14, such as in the manner described in United States patent application Ser. No. 14/448,830, entitled Module Updating Device, filed Jul. 31, 2014, the disclosure of which is hereby incorporated by reference in its entirety herein. The manager 16 may be an original equipment manufacturer (OEM) or other entity having capabilities sufficient to identify the files needed to facilitate updating those kept at the module 22. The files and related updating instructions from the remote controller 14 may be sufficient to update various controllable aspects or software-implementations executing or otherwise operating at the module 22, such as those related to vehicle operations associated with the modules 22.

In the case of the vehicle 12 being an automobile, the vehicle 12 may include any number of modules 22 configured to support, direct, implement, perform or otherwise engage various vehicle operations. The vehicle 12, for example, may include modules for: a powertrain (engine, transmission, hybrid/electric drive), HVAC (heating/cooling), driver information (vehicle speed, vehicle performance characteristics), BCM (general body controls such as lighting, door locks and more), chassis control/braking (electrical control of all braking and stability control systems), airbag/safety (control of airbag deployment and other active safety systems), infotainment (all aspects of in-vehicle audio, video, navigation and graphical user interface), heads-up display (HUD), engine control module (ECM), power control module (PCM), electronic fuel injection, automatic gear box, etc. These modules 22 may be originally manufactured with files sufficient to direct their operation and thereafter updated with new files having computer-readable instructions different in content and/or form using the local controller 20 contemplated by the present invention.

The processes performed by the local controller 20 may rely upon wireless signaling with the remote controller 14 to facilitate transmitting the files associated with updating those already resident on the modules 22 and/or providing new files for later added modules or modules not already having an initial file set. The use of wireless signaling is believed to be particularly advantageous in allowing files to be delivered to the local controller 20 virtually anywhere, including at a home of the vehicle owner. The wireless signaling may correspond with any type of wireless signaling, including but not limited to cellular signaling, Wi-Fi signaling, Internet Protocol (IP) signaling, satellite signaling, Zigbee signaling, Bluetooth signaling, etc. While the use of wireless signaling is contemplated, the present invention fully contemplates using wired or wireline signaling to support file transport, such as between the remote controller 14 and the local controller 20 and/or an intermediary between the remote controller 14 and the local controller 20, e.g., an adapter, a charging station, a wall outlet or other direct connection available between the vehicle 12 and home or other location where the vehicle 12 may be typically stored or taken for updating. Optionally, wired and/or wireless signaling may be used between the local controller 20 and the modules 22 to further facilitate transporting the files and/or instructions necessary to achieving the contemplated module updates, including communications carried out over a Controller Area Network (CAN), network or other bus included within the vehicle 12.

FIG. 2 illustrates a schematic 30 of vehicle architecture in accordance with one non-limiting aspect of the present invention. The schematic 30 illustrates a vehicle network 32 interconnecting a plurality of devices 34, 36, 38, 40, 42, over a wireline and/or wireless infrastructure, which may optionally be a controller area network (CAN) in accordance with the above-identified ISO standards. The devices 34, 36, 38, 40, 42 are labeled according to their function contemplated in accordance with one exemplary use case applicable to the present invention. The schematic illustrates one of many possible configurations where a client 34 may connect or already be connected to the CAN via a server/gateway 36 for the purposes of requesting programming of one or more of a plurality of servers 38, 40, 42 included within the vehicle. The servers 38, 40, 42 may be modules or other devices within the vehicle having capabilities sufficient to provide a vehicle related operation. A local controller 38, such as but not necessary limited to the above-described Venturo™, may be resident on the vehicle or in wired/wireless communication therewith and operable/configured in accordance with the present invention to facilitate thwarting, preventing or otherwise protecting against unauthorized updating of the servers 40, 42, such as by preventing execution of certain diagnostic services associated execute in accordance with the above-identified ISO standards, or other applicable update or diagnostics standards, and/or logging or otherwise tracking the related diagnostic services for the purpose of reporting unauthorized activities FIG. 3 illustrates a flowchart 50 of a method for thwarting unauthorized updates in accordance with the present invention. The unauthorized updates are predominately described with respect to a client attempting to program a memory included within a server, such as by attempting to replace an old file with a new file in the manner described in the above-identified patent application. The client may be computer, tablet or other device connected to the vehicle, such as through a USB port, for the purposes of initiating an unauthorized update. The described updating processes are presented for exemplary non-limiting purposes as the present invention fully contemplates its use and application in thwarting other types of updates and/or simply returning a server to a default session or other state following an attempt to place the server in an inappropriate or otherwise unsanctioned state. The method may be embodied in a computer-readable medium having a plurality of non-transitory computer readable instructions operable with a processor of the local controller or other suitable device within or in communication with the vehicle to facilitate issuing the commands, messages and otherwise executing the operations and processes contemplated herein to thwart unauthorized module updates.

Block 52 relates to determining a programming attempt being made by a client over the CAN for the purposes of programming/updating a memory of a server. The programming attempt may be determined as a function of a programming request broadcasted over the CAN to an individual server or globally to all servers in a manner that exposes the corresponding request to the local controller and optionally other servers sharing the CAN. Block 54 relates to determining whether the programming attempt is authorized, such as by analyzing the corresponding request to determine whether it includes identifying information matching a scheduled or otherwise authorized update. Block 56 relates to determining the programming attempt to be authorized and taking no further action, i.e., allowing the update to proceed as requested. Block 58 relates to determining the programming attempt to be unauthorized and logging parameters associated therewith, such as addressing information, a timestamp or other characteristics sufficient to identify a source of the request, a destination for the request, e.g., the server attempting to be updated, or other information which may be beneficial to an OEM or other entity in tracking successful/unsuccessful update attempts and ascertaining a threat level or user attempting to inappropriately update the server. Optionally, the parameter logging of Block 58 may also be performed for authorized updates.

Block 60 relates to determining whether the unauthorized programming attempt is to be engaged according to an active mode or a passive mode. Block 62 relates to the passive mode being engaged whereby no action is taken to thwart the unauthorized update other than wirelessly transmitting the logged parameters to the remote controller for assessment and/or storing the logged parameters on the local controller for subsequent transmit/recovery. Block 62 relates to the active mode being engaged whereby action is taken to prevent the unauthorized update. One non-limiting aspect of the present invention contemplates the server subjected to the unauthorized update attempt being operable in accordance with the above-identified ISO standards such that the unauthorized update can be prevented by returning the server to a default session before data is overwritten to its memory, such as with transmission of a default session message thereto. The present invention, of course, is not necessary so limited and fully contemplates its use and application in taking other measures to prevent the unauthorized update, such as by controlling the client to cease further communications, depowering the subjected server, etc. Parameters logged in Block 58 may be transmitted in Block 62 and/or additional information may be added to the transmitted parameters to indicate the successful or unsuccessful prevention of the update and/or other relevant information associated therewith, such as but not necessary limited to the actions taken to prevent update.

Figure 4:
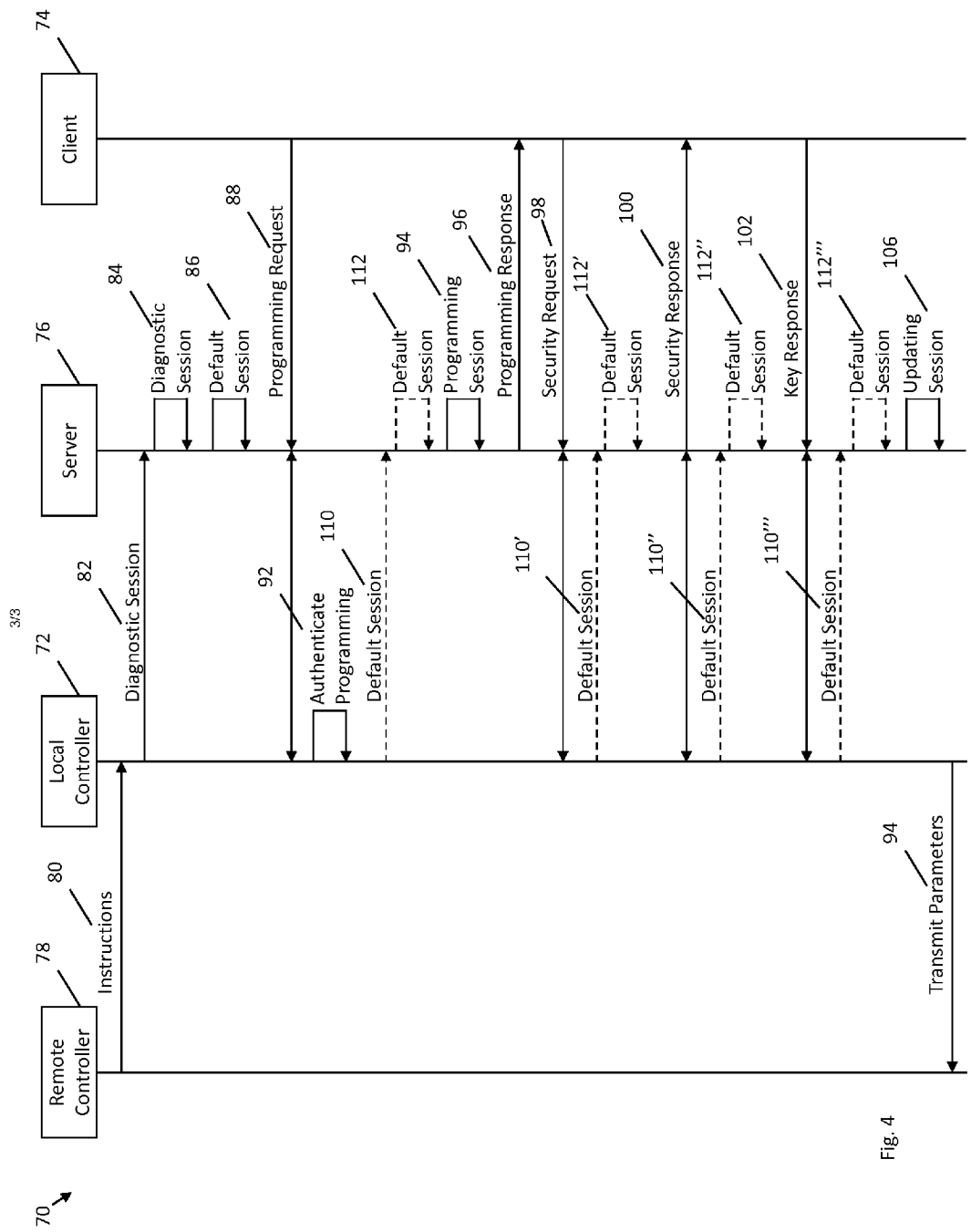
FIG. 4 illustrates a messaging diagram for updating, protecting and diagnosing a vehicle in accordance with one non-limiting aspect of the present invention.

FIG. 4 illustrates a messaging 70 diagram for updating, protecting and diagnosing a vehicle in accordance with one non-limiting aspect of the present invention. The method relates to an exemplary scenario where a local controller 72 thwarts a client 74 attempting to perform an unauthorized update of a server 76 included on a vehicle according to instructions received from a remote controller 78. The remote controller 78, local controller 72, server 76 and client 74 may correspond with those described above. The local controller 72 may be operable according to an updating mode, a diagnostic mode and a protection mode as function of corresponding updating, diagnosing and protecting instructions received from the remote controller 72, which may be transmitted thereto within one or more instruction messages 80. The local controller 72 may be configured to transmit a diagnostic or other suitable session message 82 to command the server 76 to enter a corresponding diagnostics session 84, such as to perform an update according to the above-described patent application with a DiagnosticSessionControl service noting a programmingSession subfunction and/or to engage one of the diagnostic services noted in the above-described ISO standards.

The instruction messages 80 may be periodically transmitted to the local controller 72 to instigate desired operations, e.g., a set of updating instructions may be transmitted to initiate a desired update of the server memory and a set of diagnosing instructions may be transmitted to initiate a diagnostics service or combined updating and diagnosing instructions may be transmitted to engage combined operations (updating instructions for a new file and diagnostics instructions to command the server to perform the update). The above-identified ISO standards describe various, optional diagnostics services operable with the diagnosing process contemplated herein, which are presented for exemplary non-limiting purposes as other diagnostics services may be supported according to other methodologies without deviating from the scope and contemplation of the present invention. The noted services may include (client corresponds with local controller): a DiagnosticSessionControl service to enable different diagnostic sessions in the server(s) and/or functionality in the server(s); a ECUReset service to enable the client to request a server reset; a SecurityAccess service to access data and/or diagnostic services which have restricted access for security, emissions or safety reasons; a CommunicationControl service to switch on/off transmission and/or reception of certain messages of (a) server(s) (e.g. application communication messages); a TesterPresent service to indicate to a server (or servers) that a client is still connected to the vehicle and that certain diagnostic services and/or communications that have been previously activated are to remain active; a AccessTimingParameter service to read and change default timing parameters of a communication link for the duration that this communication link is active; a SecuredDataTransmission service to transmit data that is protected against attacks from third parties, which could endanger data security; a ControlDTCSetting service to enable a client to stop or resume the setting of diagnostic trouble codes (DTCs) in the server(s); a ResponseOnEvent service to enable a server to start or stop transmission of responses on a specified event; a LinkControl service to control a communication link baud rate between the client and the server(s) for the exchange of diagnostic data; a ReadDataByIdentifier service to enable the client to request data record values from the server identified by one or more dataIdentifiers; a ReadMemoryByAddress service to enable the client to request memory data from the server via a provided starting address and to specify the size of memory to be read; a ReadScalingDataByIdentifier service to enable the client to request scaling data record information from the server identified by a dataIdentifier; a ReadDataByPeriodicIdentifier service to enable the client to request the periodic transmission of data record values from the server identified by one or more periodicDataIdentifiers; a DynamicallyDefineDataIdentifier service to enable the client to dynamically define in a server a data identifier that can be read via the ReadDataByIdentifier service at a later time; a WriteDataByIdentifier service to enable the client to write information into the server at an internal location specified by the provided data identifier; a WriteMemoryByAddress service to enable the client to write information into the server at one or more contiguous memory locations; a ClearDiagnosticInformation service to enable the client to clear diagnostic information in one server's or multiple servers' memory; a ReadDTCInformation service to enable a client to read the status of server-resident Diagnostic Trouble Code (DTC) information from any server or group of servers within a vehicle; a InputOutputControlByIdentifier service to enable the client to substitute a value for an input signal, internal server function and/or control an output (actuator) of an electronic system; a RoutineControl service to enable the client to start a routine, stop a routine, and request routine results; a RequestDownload service to enable the client to initiate a data transfer from the client to the server (download); a RequestUpload service to enable the client to initiate a data transfer from the server to the client (upload); a TransferData service to enable the client to transfer data either from the client to the server (download) or from the server to the client (upload); and a RequestTransferExit service to enable the client to terminate a data transfer between client and server (upload or download).

The server 76 may return to a default session 86 following completion of the diagnostic session 84. The default session 86 may correspond with a typical operating state of the server 76 when not being controlled to another session or otherwise engaging in an update or abnormal operation. One non-limiting aspect of the present invention contemplates the instructions 80 provided to the local controller 72 including security related information sufficient to enable the local controller 72 to operate in a prevention mode where actions may be undertaken to thwart unauthorized updates to the server 76. While the unauthorized updates may be performed according to any standard and set of messages, the diagram depicts an exemplary scenario where the client 74 attempts to update the server using the DiagnosticSessionControl service with a programmingSession subfunction. The client 74 may attempt to initiate the update/programming process by transmitting a programming request message 88 to the server 76, which may be globally transmitted to all devices connected to the CAN such that it may be received by the server 76 as well as the local controller 72 and/or the local controller 72 may be positioned or configured to snoop for messages unicast or otherwise transmitted directly to the server 76. The programming request 88 may look like $address, 02 10 02 00 00 00 00 00 if formatted according to the programmingSession subfunction where the first byte is the length of the diagnostic message, the 10 shows its type as DiagnosticSessionControl and the 02 is the sub type indicating the programmingSession.

The local controller 72 may process the programming request to identify parameters associated therewith, such as a timestamp for identifying when the message was transmitted, addressing information identifying a recipient and/or a source of the message, some function or other identifying functional information, etc. The local controller 72 may then perform an authentication process 92 to determine whether the corresponding programming request is authorized. The programming request 88 may be determined to be authorized if previously scheduled for the server 76, e.g., the remote controller 72 may provide a schedule of desired updates for the server 76 that can be cross-reference with identifying information within the request message 88 or identified based on a time of day or other predefined characteristic associated with the programming request. The determination of whether the update is authorized may be performed as a function of the previously received instructions and/or the local controller 72 may optionally contact the remote controller for instructions, such as by issuing wireless signals thereto. An unauthorized update may also be determined by a frequency at which the server 76 receives programming request, e.g., multiple programming request may be transmitted to the server 76 in a brute-force attack where security information, seeds, keys etc. are repeatedly transmitted in order to gain access to the server 76, such that an unauthorized update may be assumed if such activity occurs a certain number of times within a predefined interval. As the timing to take preventive action may be relatively short, it may be beneficial to provide the local controller 72 with instructions identifying authenticated updates before detecting the programming request 88.

The local controller 72 may be similarly instructed to thwart unauthorized programming requests according to a passive mode or an active mode. The passive mode may be generally characterizes a process where the local controller 72 tracks activity believed to be unauthorized for the purposes of subsequently transmitting associated parameters to the remote controller 78 in a transmission operation 94. The logged parameters may be beneficial in enabling an OEM, security personnel or others to track behavior and attempts to update the server 76, which may be particularly beneficial when a vehicle owner takes the vehicle to a repair shop for service. The logged parameters may be provided to enable the repair shop to identify a current software version of the server 76 and whether any prior versions were improperly installed or whether the server 76 is currently operating according to an unauthorized version. The local controller 72 may act as a trusted agent having capabilities sufficient to facilitate updating and tracking vehicle related operations so as to provide useful feedback to repair personnel and others regarding historical activities without requiring the servers 76 to perform the tracking, e.g., by simply configuring the remote controller 72 in the manner contemplated herein the benefits of the present invention can be achieved without having to alter the intended operation of the servers 76 to compensate for security threats.

The passive mode may thwart the unauthorized update by reporting the corresponding activity while allowing the update to occur. The server 76 may initiate a programming session 94 or other suitable session to begin a sequence of events necessary to perform the update according to the ISO standards or other operational setting attendant to the programming request. Assuming the server 76 operates according to the ISO standards, a programming response 96 may be transmitted to the client 74 to indicate availability to start programming. In the event the server 76 operates according to certain security parameters, a key may be required before the client 74 can successfully perform the requested update. The diagram illustrates a sequence of messages 98, 100, 102 that may be exchanged in order to generate the key and assess its authenticity, which may begin with the client transmitting a security request 98 for the purposes of requesting a seed from the server 76. The server 76 may respond to the security request 98 with a security response 100 having the desired seed. The client 74 may then transmit a key response 102 having a key generated by the client in response to the seed received in the security response 100 (see ISO standards regarding key generation and usage of seed).

The server 76 may engage an updating session 106 to update its memory according to files or other information received from the client 74 if the key is authenticated. Additional messages may optionally be exchanged between the client and server 76, 74 when attempting to perform the unauthorized update as those presented above are merely exemplary and shown to demonstrate various opportunities for the local controller 72 to assess status and take corrective action. The security-related message 98, 100, 102 exchanges are also presented to demonstrate one non-limiting aspect of the present invention where brute-force attacks can be thwarted. The brute-force attacks may correspond with attempts made by the client 74 to repetitively generate a key suitable for accessing the server 76, such as by repeatedly requesting the seed and generating different keys until an authenticated/working key is determined. The passive mode may log and report each unsuccessful attempt to submit the key while allowing the attempts to continue. The local controller 72 may optionally operate according to the active mode in order to prevent the client from such repeated attacks.

The active mode may be generally characterized by the local controller 72 taking action to prevent the server 76 from reaching the updating session 106 or completing other actions resulting in its memory being updated according to instructions received from the client 74. The present invention contemplates the local control controller 72 performing various operations to prevent the unauthorized update, including transmitting messages 110, 110', 110", 110''' to the server 76 sufficient to return the server 76 to a default session 112, 112', 112", 112''' or other state where the server 76 is unable to perform updates. The server 76 may be unable to perform updates when in the default session 112, 112', 112", 112''', at least until the client 74 or other entity trying to update it re-transmits the programming request 88. The local controller 72 may be utilized to essentially return the server 76 to the default session 112, 112', 112", 112''' using messaging already known and programmed on the server 76, thereby enabling the present invention to thwart updates without requiring any operational or software changes to the server 76. One non-limiting aspect of the present invention contemplates the local controller 72 transmitting the default session message 110, 110', 110", 110''' to the server 76 at one of a number of suitable opportunities, such as after authenticating the requested update 88, detecting the response message 96, detecting the security request 98, detecting the security response 100 and detecting the key response 102.

The default session message 110, 110', 110", 110''' may look like $address, 02 10 01 00 00 00 00 00 if formatted according to the defaultSession subfunction where the first byte is the length of the diagnostic message, the 10 shows its type as DiagnosticSessionControl and the 01 is the sub type indicating the defaultSession. The local controller 72 may transmit the default session message 110, 110', 110", 110''' globally to all servers and/or to the server 76 intended for update, such as by copying an address included within the programming request 88 for the purposes of addressing the default session message 110, 110', 110", 110'''. The diagram 70 illustrates transmission of the default session message 110, 110', 110", 110''' and corresponding engagement of the related default session 112, 112', 112", 112''' in dashed lines to indicate the various opportunities when the unauthorized update may be prevented. One non-limiting aspect of the present invention contemplates timing transmission of the default session message 112, 112', 112", 112''' to occur when the server 76 is in a state suitable to processing it, e.g., the server 76 may be unable to process the default session message 112, 112', 112", 112''' if it arrives to quickly following receipt of the programming request such that the local controller 72 may await expiration of a timer or other timing element before transmitting the default session message.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for thwarting unauthorized programming of a server included on a road vehicle comprising:
   inspecting a programming message transmitted from a client to the server for the purposes of requesting a programming of the server;
   determining whether the programming message is one of authorized and unauthorized; and
   engaging one of a passive mode and an active mode in the event the programming message is unauthorized, including:
   i) transmitting a default message to the server sufficient to return the server to a default session before the server updates a memory pursuant to the requested programming if engaged according to the active mode;
   ii) allowing the server to update the memory pursuant to the programming if engaged according to the passive mode; and
   iii) logging parameters associated with the programming message, the parameters including at least a timestamp and an address.

2. The method of claim 1 further comprising detecting the programming message with a local controller in communication with a controller area network (CAN), the CAN being used to deliver the programming message from the server to the client, the local controller being physically connected to the road vehicle and incapable of preventing the programming message from traveling over the CAN between the client and the server.

3. The method of claim 2 further comprising transmitting the default session message from the local controller over the CAN to an address copied from information included within the programming message, including transmitting the default message in the event the active mode is engaged and preventing transmitting the default message in the event the passive mode is engaged.

4. The method of claim 1 further comprising:
   determining whether to engage the passive or active mode as a function of a mode instruction wirelessly received from a remote controller located outside of the road vehicle; and
   non-wirelessly transmitting the default message to the server over a controller area network (CAN) used to deliver the programming message from the server to the client in the event the mode instruction specifies the active mode.

5. The method claim 1 further comprising wirelessly transmitting the parameters logged for the programming message to a remote controller located outside of the road vehicle.

6. A non-transitory computer-readable medium having a plurality of non-transitory instructions operable with a controller to facilitate thwarting a client from updating a server when the controller, client and server are physically connected to a vehicle, the non-transitory instructions being sufficient for:
   inspecting a programming request made by the client to request an update of the server to determine whether the programming request is authorized or unauthorized;
   taking no action against the server to prevent the update when the programming request is authorized;
   determining whether to engage a passive mode and an active mode to thwart the update when the programming request is unauthorized; and
   engaging the active mode when the programming request is unauthorized and the active mode is engaged, the active mode including the controller transmitting a default message to the server sufficient to prevent the server from performing the update pursuant to the programming request before a memory or other data construct of the server is overwritten as a function thereof, the default message being sufficient for controlling the server to cease further processing of the programming request through a return or other transition to a default session or other suitable operating state; and
   engaging the passive mode when the programming request is unauthorized and the passive mode is engaged, the passive mode including preventing the controller from transmitting the default message to the server such that the server is permitted to perform the update.

7. The non-transitory computer-readable medium of claim 6 further comprising non-transitory instructions sufficient for:
   determining the programming request as a function of the controller detecting a request message transmitted from the client to the server over a controller area network (CAN) of the vehicle; and
   engaging either of the passive mode and the active mode after detecting the request message such that the request message reaches the server before the update can be thwarted.

8. The non-transitory computer-readable medium of claim 7 further comprising non-transitory instructions sufficient for:
   instigating a timer upon detecting the request message, including setting a duration of the timer to approximate time needed for the server to process the request message after being received from the client over the CAN; and
   awaiting completion of the timer before transmitting the default message from the controller to the server over the CAN so as to ensure the server is in a state suitable to processing of the default message.

9. The non-transitory computer-readable medium of claim 7 further comprising non-transitory instructions sufficient for:
   detecting a response message transmitted from the server to the client over the CAN in response to the request message, the response message indicating availability to start the programming; and
   awaiting at least for detection of the response message before transmitting the default message.

10. The non-transitory computer-readable medium of claim 9 further comprising non-transitory instructions sufficient for:
    detecting a security request transmitted from the client to the server over the CAN in response to the response message, the security request requesting the server to provide a seed to the client; and
    awaiting at least for detection of the security request before transmitting the default message.

11. The non-transitory computer-readable medium of claim 10 further comprising non-transitory (Currently Amended) sufficient for:
    detecting a security response transmitted from the server to the client over the CAN in response to the security request, the security response including the seed requested in the security request; and
    awaiting at least for detection of the security response before transmitting the default message.

12. The non-transitory computer-readable medium of claim 11 further comprising non-transitory instructions sufficient for:
    detecting a key response transmitted from the client to the server over the CAN in response to the security response, the key response including a key generated by the client as a result of processing the seed included in the security response; and
    awaiting at least for detection of the security response before transmitting the default message.

13. The non-transitory computer-readable medium of claim 7 further comprising non-transitory instructions sufficient for:
    logging parameters associated with the request message, the parameters including at least a timestamp and an address for the request message; and
    wirelessly transmitting a report having the logged parameters to a device physically disconnected from the vehicle, thereby thwarting the update at least through identification of the timestamp and the address included in the report.

14. The non-transitory computer-readable medium of claim 7 further comprising non-transitory instructions sufficient for generating the default message such that the server returns to a default session whereupon the default session prevents the server from continuing processing of the update previously requested in the request message at least until subsequently requested by the client to re-start the update.

15. The non-transitory computer-readable medium of claim 7 further comprising non-transitory instructions sufficient for:
    determining one or more parameters for the request message;
    comparing the parameters to predefined characteristics included within a schedule provided to the controller prior to detecting the request message;
    determining the update to be authorized when the parameters sufficiently cross-reference with the predefined characteristics to indicate the update as being previously authorized; and
    determining the update to be unauthorized when the parameters fail to sufficiently cross-reference with the predefined characteristics to indicate the update as failing to have been previously authorized.

16. The non-transitory computer-readable medium of claim 6 further comprising non-transitory instructions sufficient for wirelessly receiving a plurality of instructions from a device physically disconnected from the vehicle, the plurality of instructions including instructions sufficient for determining whether the update is authorized or unauthorized and instructions sufficient for determining whether to engage the passive mode or the active mode.

17. The non-transitory computer-readable medium of claim 16 further comprising non-transitory instructions sufficient for determining whether to engage the passive mode and the active mode to thwart the update depending on an operation the server performs within the vehicle such that the passive mode is engaged when the operation is of a first type and the active mode is engage when operation is of a second type, the second type being different than the first type.

18. The non-transitory computer-readable medium of claim 16 further comprising non-transitory instructions sufficient for determining whether to engage the passive mode when the update occurs at a first instance in time and to engage the active mode when the update occurs at a second instance in time different than the first instance.

19. The non-transitory computer-readable medium of claim 6 further comprising non-transitory instructions sufficient for non-wirelessly transmitting the default message from the controller to the server.

20. A system for protecting a module included within a vehicle from unauthorized updates, the module being configured to facilitate a vehicle related operation according to a corresponding plurality of non-transitory computer-readable instructions stored on a memory, the system comprising:
    a remote controller physically disconnected from the vehicle, the remote controller configured to wirelessly transmit a protection instruction sufficient for identifying one or more authorized updates for the module and whether unauthorized updates of the module are to be thwarted according to a passive mode or an active mode; and a local controller physically connected to a controller area network (CAN) shared with the module, the local controller configured to wirelessly receive the protection instructions from the remote controller and includes a non-transitory computer-readable medium having a plurality of non-transitory instructions, which when executed with a processor associated therewith, sufficient to:

i) determine whether a programming requested by a client connected to the CAN for the purposes of updating the module is one of the authorized updates;

ii) transmit a default message to the module over the CAN to prevent the module from performing the programming if the programming is unauthorized and to be thwarted according to the active mode, the default message causing the module to return to a default session or other state sufficient to cease further processing of the programming requested by the client prior to a memory associated therewith being overwritten as a function thereof; and iii) allow the module to perform the programming if the programming is unauthorized and to be thwarted according to the passive mode.

21. The system of claim 20 wherein the non-transitory instructions are sufficient to:

log parameters associated with the programming at least when unauthorized;

wirelessly transmit the parameters to the remote controller within a report having the parameters, thereby thwarting the update at least through identification of the parameters included in the report;

determining the programming requested by the client from processing of a request message transmitted over the CAN from the client to the module; and determining whether the programming is one of the authorized updates without interrupting transmission of the request message over the CAN from the client to the module.

22. The system of claim 20 wherein the non-transitory instructions are sufficient to:

determine the vehicle related operation facilitated with the module to be one of a first type and a second type;

engage the active mode when the programming is unauthorized and the vehicle related operation is the first type; and engage the passive mode when the programming is unauthorized and the vehicle related operation is the second type, the second type being different than the first type so as to selectively engage the active mode and the passive mode according to the vehicle related operation associated with the programming requested by the client.

23. A method for thwarting unauthorized programming of a server included on a road vehicle comprising:

inspecting a programming message transmitted from a client to the server for the purposes of requesting a programming of the server;

determining whether the programming message is one of authorized and unauthorized;

engaging one of a passive mode and an active mode in the event the programming message is unauthorized, including:

i) transmitting a default message to the server sufficient to return the server to a default session before the server updates a memory pursuant to the requested programming if engaged according to the active mode; and ii) allowing the server to update the memory pursuant to the programming if engaged according to the passive mode preventing engagement of the active and passive modes in the event the programming message is authorized;

taking no action to prevent the server from receiving the programming message from the client regardless of whether the programming message is authorized or unauthorized;

engaging the passive mode in the event the programming message is determined at a first instance in time to be unauthorized; and engaging the active mode in the event the programming message is determined at a second instance in time to be unauthorized, the second instance being different than the first instance.

24. A method for thwarting unauthorized programming of a server included on a road vehicle comprising:

inspecting a programming message transmitted from a client to the server for the purposes of requesting a programming of the server;

determining whether the programming message is one of authorized and unauthorized;

engaging one of a passive mode and an active mode in the event the programming message is unauthorized, including:

i) transmitting a default message to the server sufficient to return the server to a default session before the server updates a memory pursuant to the requested programming if engaged according to the active mode; and ii) allowing the server to update the memory pursuant to the programming if engaged according to the passive mode taking no action to prevent the server from receiving the programming message from the client;

determining an operation performed for the road vehicle with the server to be one of a first type and a second type;

engaging the active mode in the event the programming message is unauthorized and the operation is the first type; and engage the passive mode in the event the programming message is unauthorized and the operation is the second type, the second type being different than the first type so as to selectively engage the active mode and the passive mode according to the operation of the server.

* * * * *